United States Patent Office 2,799,676
Patented July 16, 1957

2,799,676
PROCESS OF PREPARING A THIOTHIAZOLONE COMPOUND

Emil J. Maxion, Queens Village, N. Y., assignor to Chase Chemical Company, Newark, N. J., a corporation of New Jersey No Drawing. Application December 24, 1953, Serial No. 400,362

4 Claims. (Cl. 260—256.5)

This invention relates to a process for preparing the thiothiazolone compound N-(2'-methyl-4'-aminopyrimidyl-5'-)-methyl-4-methyl-β- hydroxyethyl - thiothiazolone by the condensation of 2-methyl-4-amino-5-aminomethyl pyrimidine, alpha-chloro-alpha-aceto-gamma-butyrolactone and carbon disulfide in the presence of a basic, acid-neutralizing agent, followed by cyclization to the thiothiazolone compound under acid conditions. The reaction is carried out in the presence of a lower aliphatic alcohol such as ethanol, but other lower aliphatic alcohols such as methanol and isopropanol may optionally be employed.

In accordance with the invention, 2-methyl-4-amino-5-aminomethyl pyrimidine is condensed with alpha-chloro-alpha-aceto-gamma-butyrolactone and carbon disulfide in the presence of a basic, acid-neutralizing agent and then, by rendering the reaction mixture acidic with a mineral acid and boiling under reflux, the intermediate product is cyclized to the above-mentioned thiothiazolone compound.

The reactions involved may be represented as follows:

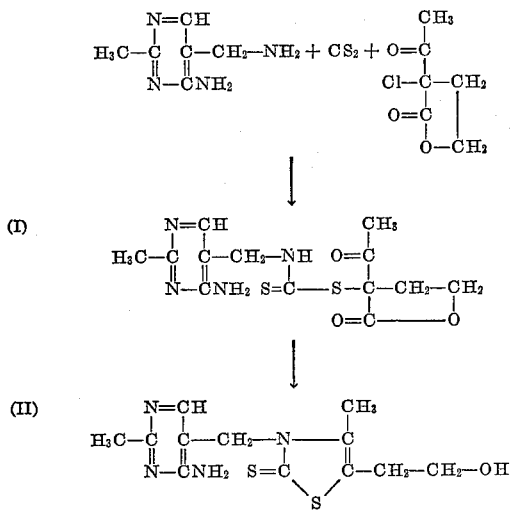

The thiothiazolone compound (II), which is a known intermediate for the preparation of vitamin B₁, obtained by the above reactions may be readily oxidized to form vitamin B₁ or related compounds according to methods well known to those skilled in this art.

The invention is illustrated by the following detailed example which is not intended as limitative:

Example

A solution of 21.1 grams of 2-methyl-4-amino-5-aminomethyl pyrimidine hydrochloride dissolved in the smallest amount of water possible for complete solution was mixed with 16.0 milliliters of 50% weight-in-weight sodium hydroxide, and 50.0 milliliters of ethanol, 10.0 milliliters of 28% aqueous ammonia and 16.3 grams of alpha-chloro-alpha-aceto-gamma-butylrolactone were added to the mixture and then 8.0 grams of carbon disulfide were also added with cooling. The reaction was allowed to run to completion and, when completed, 50 milliliters of 20% hydrochloric acid were added and the solution then boiled under reflux for 30 minutes. The ethanol was removed by distillation under reduced pressure. To the residue 30% sodium hydroxide was added until the mixture was strongly alkaline, whereupon a crystalline product separated out which was removed by suction filtration and washed with water until the washings were no longer alkaline. The crude product so obtained was suitable for conversion to vitamin B₁ by oxidation, as above set forth, but could be purified further by re-crystallization from aqueous ethanol, whereupon colorless crystals of N-(2'-methyl-4'-aminopyrimidyl-5'-)-methyl - 4 - methyl - β - hydroxyethyl-thiothiazolone were obtained having a melting point of 239° C. The mono-hydrochloride of the aforesaid compound melted with decomposition at 245° C.

The structure of the thiothiazolone compound was confirmed both by its conformity to the physico-chemical properties of authentic samples prepared by known methods and also by the conversion to vitamin B₁ by oxidation.

The invention is defined by the appended claims.

I claim:

1. The process of preparing the thiothiazolone compound N-(2'-methyl-4'-aminopyrimidyl - 5'-) - methyl-4-methyl-β-hydroxyethylthiothiazolone, which comprises simultaneously reacting in ethanol 2-methyl-4-amino-5-amino-methyl pyrimidine with alpha-chloro-alpha-aceto-gamma-butyrolactone and carbon disulfide in the presence of sodium hydroxide, acidifying the reaction mixture with hydrochloric acid and heating to cyclize the resulting intermediate reaction product, and recovering the said thiothiazolone compound so produced.

2. The process of preparing N-(2'-methyl-4'-aminopyrimidyl-5'-)-methyl-4-methyl-β-hydroxyethyl- thiothiazolone, which comprises simultaneously reacting in a lower aliphatic alcohol medium 2-methyl-4-amino-5-aminomethyl pyrimidine with alpha-chloro-alpha-aceto-gamma-butyrolactone and carbon disulfide in the presence of a strong, inorganic base and cyclizing the intermediate product so produced by boiling with a mineral acid.

3. The process of preparing N-(2'-methyl-4'-aminopyrimidyl-5'-)-methyl-4-methyl-β-hydroxyethyl- thiothiazolone, which comprises admixing an aqueous solution of 2-methyl-4-amino-5-aminomethyl pyrimidine hydrochloride with sodium hydroxide, adding ethanol, aqueous ammonia and α-chloro-α-aceto-γ-butyrolactone thereto, adding carbon disulfide and cooling, allowing the reaction to run to completion, then adding hydrochloric acid and refluxing, removing the ethanol by distillation under reduced pressure, alkalinizing with sodium hydroxide and recovering the crystalline product which separates out.

4. The process of preparing N-(2'-methyl-4'-aminopyrimidyl-5'-)-methyl-4-methyl-β-hydroxyethyl- thiothiazolone which comprises simultaneously reacting 2-methyl-4-amino-5-amino-methyl pyrimidine with α-chloro-α-aceto-γ-butyrolactone and carbon disulfide in a lower aliphatic alcohol medium and in the presence of a strong inorganic base, and then cyclizing the resulting intermediate reaction product by acidifying the reaction mixture with a mineral acid and heating the acidified mixture.

References Cited in the file of this patent

UNITED STATES PATENTS

| | | |
|---|---|---|
| 2,127,446 | Klingfuss | Aug. 16, 1938 |
| 2,252,921 | Foldi | Aug. 19, 1941 |
| 2,356,594 | Koenig et al. | Aug. 22, 1944 |
| 2,592,930 | Matsukawa et al. | Apr. 15, 1952 |
| 2,676,175 | Yoshida et al. | Aug. 20, 1954 |

OTHER REFERENCES

Hibino et al.: J. Fermentation Technol. (Japan), 28, 262-66 (1950) (cited in C. A. 47, 11331b, 1953).